United States Patent [19]

Tamashiro

[11] Patent Number: 5,094,045
[45] Date of Patent: Mar. 10, 1992

[54] TERMITE BARRIER

[75] Inventor: Minoru Tamashiro, Kailua, Hi.

[73] Assignee: University of Hawaii, Honolulu, Hi.

[21] Appl. No.: 656,112

[22] Filed: Feb. 13, 1991

Related U.S. Application Data

[63] Continuation of Ser. No. 225,244, Jul. 27, 1988, abandoned.

[51] Int. Cl.$^5$ ............................................. A01M 1/20
[52] U.S. Cl. .................................................. 52/101
[58] Field of Search ........................................ 52/101

[56] References Cited

U.S. PATENT DOCUMENTS

| | | |
|---|---|---|
| 1,049,221 | 12/1912 | Frankignoul . |
| 1,615,350 | 1/1927 | Tambone ............... 52/169.5 X |
| 2,347,776 | 5/1944 | Gunn . |
| 2,352,338 | 6/1944 | Muirhead . |
| 2,581,521 | 1/1952 | Davis . |
| 2,674,765 | 4/1954 | Tennison . |
| 2,899,771 | 8/1959 | Burris . |
| 2,915,848 | 12/1959 | Griffin . |
| 2,952,938 | 9/1960 | Abams . |
| 3,407,552 | 10/1968 | Cassidy ................... 52/169.5 |
| 3,473,689 | 10/1969 | Hutter ..................... 52/292 |
| 4,015,432 | 4/1977 | Ball . |
| 4,142,344 | 3/1979 | Palmaer ................ 52/169.5 X |
| 4,625,474 | 12/1986 | Peacock . |
| 4,800,666 | 1/1989 | Lukehart ................ 43/4.5 X |
| 4,823,520 | 4/1989 | Ebeling et al. ............. 52/101 |

OTHER PUBLICATIONS

"Sand Barriers for Subterranean Termite Control", *The IBM Practitioner* vol. X, No. 5, by Walter Ebeling & Charles Forbes (May 1988).

"Relation of Particle Size to the Penetration of Subterranean Termites through Barriers of Sand or Cinders", *Journal of Economic Entomology* vol. 50, No. 5, by Walter Ebeling & Roy J. Pence, pp. 690-692 (Oct. 57).

Primary Examiner—David A. Scherbel
Assistant Examiner—Michele A. Van Patten
Attorney, Agent, or Firm—Martin E. Hsia

[57] ABSTRACT

A termite barrier comprising granular material having granules with sizes ranging from 1.7 millimeters to 2.4 millimeters made of sand, gravel, rock or basalt.

51 Claims, 1 Drawing Sheet

TERMITE BARRIER

This is a continuation of copending application Ser. No. 225,244, filed on July 27, 1988, now abandoned.

BACKGROUND OF THE INVENTION

This invention relates to a termite barrier to prevent the penetration of termites from the ground into a building.

The problem of termites penetrating into buildings from the ground and causing structural damage is old. Further, the damage caused by such termites can be extremely costly to repair. For example, the Formosan termite, which is among the smallest but most destructive of termites, reportedly causes millions of dollars of control and repair costs each year. The Formosan termite is capable of penetrating concrete, tin, copper and hard plastic, so some form of protection is often necessary to prevent damage to structural members exposed to the Formosan termite.

Many approaches have been tried to prevent termites from penetrating into structures.

One approach is to incorporate insecticide impregnated materials into the construction of a building. For example, U.S. Pat. No. 2,899,771 to Burris teaches the placement of a vapor barrier comprising an insecticide impregnated polyethylene film placed between a concrete slab and the ground. Similarly, U.S. Pat. No. 2,952,938 issued to Abrams teaches the use of a resin coated felt layer impregnated with an insecticide that is intended to spread into the ground underneath. Currently, it is common practice to treat the ground beneath a building with chemicals prior to construction in order to poison the soil against termites.

Another approach is to use built-in insecticide stribution systems, such as described in U.S. Pat. No. 2,95,418 issued to Griffin and U.S. Pat. No. 4,625,474 issued to Peacock.

A major disadvantage of termite control methods utilizing insecticide or chemicals is the effect of such pesticides or chemicals on the environment. Due to such concerns, many of the insecticides commonly used have been outlawed or restricted by the Environmental Protection Agency of the United States. Further, insecticide treatment often requires special precautions and specially trained personnel during application of the insecticides, which increases the cost of construction. A still further disadvantage of methods utilizing insecticide is the necessity for retreatment at periodic intervals, which increases costs and increases the risk of exposure to insecticides.

Alternative approaches to preventing penetration of termites that do not utilize insecticides include making structural modifications to buildings. For example, U.S. Pat. No. 2,581,521 issued to Davis describes a method of constructing a building that provides a ventilated passage around the building along the junction of the foundation wall and the superstructure. U.S. Pat. No. 2,352,338 to Muirhead describes the use of precast beams filled with a concrete-based homogenous material. U.S. Pat. No. 2,674,765 to Tennison discloses lock joint configurations for metal termite shields. Finally, U.S. Pat. No. 2,347,776 teaches the combined use of insecticide and structural design in order to confine termite damage to certain predetermined areas which are less costly to replace or repair. However, a disadvantage of these structural inventions is that they increase the complexity of construction.

Thus, there is a need for a termite barrier that does not employ insecticides or other environmentally hazardous substances and yet does not substantially increase the complexity or cost of construction. There is a further need for such a termite barrier that is permanent and does not require retreatment.

It is therefore an object of this invention to provide an effective termite barrier that does not utilize chemical insecticides.

It is a further object of this invention to provide such a termite barrier that may be easily installed and does not substantially increase the cost or complexity of construction.

It is a still further object of this invention to provide such a termite barrier that is permanent.

SUMMARY OF THE INVENTION

These and other objects are achieved by depositing a layer of granular material between a building and the ground, wherein at least 60% of the granules in the material have at least one dimension ranging from 1.7 millimeters to 2.4 millimeters in diameter. Granules of this particular size prove to be too large for termites to move, too small when packed together to find space for tunneling, and too hard to chew. The granules can be made of sand, gravel, rock or basalt, with basalt being the preferred material. Although the maximum penetration of the barrier is approximately one-quarter inch, it is preferred that the barrier be laid down in a layer approximately four inches thick to conform to normal construction practices.

The termite barrier of the present invention can be used in connection with existing construction by digging trenches around a building and then depositing granules in accordance with this invention in the trenches to form a barrier. This process can also be used around individual structural members of a building.

DESCRIPTION OF A PREFERRED EMBODIMENT

Figure 1:
FIG. 1 is a perspective view of the granules used in the practice of this invention.

Referring to FIG. 1, the granules 10 used for the practice of this invention preferably should have diameters of between 1.7 millimeters and 2.4 millimeters. If the granules 10 are significantly larger than these dimensions, then the termites would be able to tunnel between the granules 10. If the granules 10 are smaller than the preferred size, then the termites would be able to move the granules 10. The granules 10 may range in size and are preferably irregular in shape. It is preferred that at least approximately 60% of the granules conform to the preferred dimensions. The preferred specifications for crushed basaltic rock to be used with this invention are as follows:

| Sieve | Size | Percent Passing |
| --- | --- | --- |
| 4M | 4.75 mm | 100 |
| 8M | 2.36 mm | 95–100 |
| 10M | 2.00 mm | 75–95 |

-continued

| Sieve | Size | Percent Passing |
| --- | --- | --- |
| 12M | 1.70 mm | 35-50 |
| 16M | 1.18 mm | 0-10 |

The particles should be crushed basaltic rock with the following minimum requirements:
Specific Gravity: 2.80
$SiO_2$, %: 45
L.A. abrasion, % loss, 500 Revolutions: 20.

Preferably the granules 10 are made of rock, gravel, sand or basalt because they will then be too hard for the termites to chew or break into smaller pieces. Other materials having approximately the same density and hardness also may be used in this invention. The specific gravity of the preferred granules for the practice of this invention is 2.9.

Figure 2:
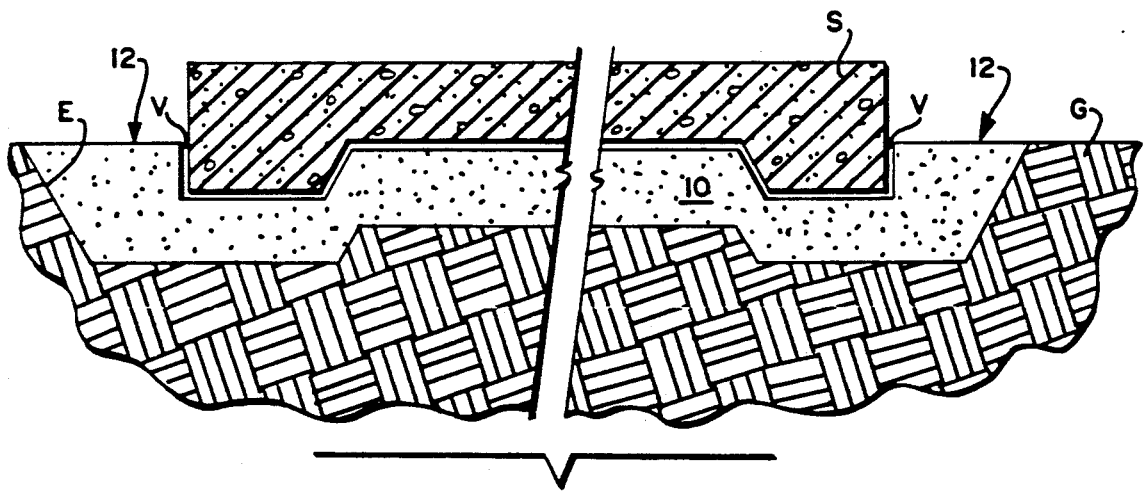
FIG. 2 is a schematic view of a termite barrier in accordance with this invention (not to scale) utilized in connection with a typical slab on grade construction.

FIG. 2 shows the use of a termite barrier in accordance with the present invention in a typical slab on grade construction. In such construction, an excavation E is made in the ground G to accept a slab S on which a building will be constructed. The granules 10 are deposited in the excavation E in a layer, thus forming a termite barrier 12. In order to prevent settling of the slab S after construction is completed, it is preferred that the termite barrier 12 be compacted, but such compaction is unnecessary for the termite barrier 12 to be effective.

A standard construction practice would be to deposit gravel as "fill" in the excavation E, and then to compact the "fill." The depth of such fill would usually be approximately 4 inches. Accordingly, in order to conform with standard construction practice, it is preferred that the termite barrier 12 have a thickness of at least approximately 4 inches so that the termite barrier 12 also can function as "fill."

It is preferred that a vapor barrier V be placed between the termite barrier 12 and the slab S to prevent the penetration of vapors and moisture into the slab S. Because of the size of the granules 10 in the termite barrier 12, a capillary rise will be induced in any water underneath the termite barrier 12. A vapor barrier V is particularly preferred where the water table may be close to the ground surface, unless base materials coarser than the termite barrier are used.

After the termite barrier 12 has been deposited and compacted and the vapor barrier V has been installed, the slab S can be poured on top of the vapor barrier V.

It is preferred that the edges of the termite barrier 12 be sealed at the edges in order to keep dirt and water from contaminating the termite barrier 12. It is preferred that this seal comprise 2 inches of S4C material or a concrete walkway on a base of granules 10 for the termite barrier 12. Further details about construction methods around the edges of the termite barrier 12 are contained in an analysis performed by soils engineers attached as Appendix 1 and incorporated herein by reference.

Because the invention provides a physical barrier to termites, physical penetration of the barrier by grass, tree roots, shrubs and plants can impair the effectiveness of the termite barrier 12. Of course, bridges across the termite barrier 12 (such as wood chips left on top of the termite barrier 12 next to the wood panellling of a structure) also can impair its effectiveness. Therefore, landscaping, sprinkler design and maintenance should be planned to avoid any such physical penetration.

It will be obvious to those skilled in the art that various changes may be made in the preferred embodiment described herein without departing from the spirit and scope of the invention. Therefore, the invention is not to be limited by what is shown in the drawings and described in the specification, but shall be limited only as indicated in the attached claims.

The invention is intended to cover all modifications, embodiments and equivalents which fall within the spirit and scope of the claims. For example, in the claims, "structure" shall be deemed to mean and include "building", "foundation", "wall", "basement", "structural member", "post" and any other portion of an improvement that is in contact with the ground.

I claim:

1. A barrier for preventing penetration of termites into a structure from the ground, comprising:
   a layer of granular material deposited between said structure and the ground, wherein between approximately 45% and approximately 65% by weight of said granular material consists essentially of granules having at least one dimension between approximatley 1.7 millimeters and approximately 2.4 millimeters.

2. A barrier for preventing penetration of termites into a structure from the ground, as described in claim 1, wherein approximately 65% by weight of said granular material consists essentially of granules having diameters between approximately 1.7 millimeters and approximatley 2.4 millimeters.

3. A barrier for preventing penetration of termites into a structure from the ground, as described in claim 1, wherein approximately 60% by weight of said graunular material consists essentially of granules having diameters between approximately 1.7 millimeters and approximately 2.4 millimeters.

4. A barrier for preventing penetration of termites into a structure from the ground, as described in claim 1, wherein approximately 50% by weight of said graunular material consists essentially of granules having diameters between approximately 1.7 millimeters and approximately 2.4 millimeters.

5. A barrier for preventing penetration of termites into a structure from the ground, as described in claim 1, wherein approximately 45% by weight of said graunular material consists essentially of granules having diameters between approximately 1.7 millimeters and approximately 2.4 millimeters.

6. A barrier for preventing penetration of termites into a structure from the ground, comprising:
   a layer of granular material deposited between said structure and the ground, wherein between approximately 60% and approximately 50% by weight of said granular material consists essentially of granules having at least one dimension between approximatley 1.7 millimeters and approximately 2.4 millimeters.

7. A barrier for preventing penetration of termites into a structure from the ground, consisting essentially of:
   a layer of granular material deposited between said structure and the ground, wherein between approximately 50% and approximately 60% by weight of said granular material consists essentially of granules having at least one dimension between approximatley 1.7 millimeters and approximately 2.4 millimeters.

8. A barrier for preventing penetration of termites into a structure from the ground, consisting essentially of:
   a layer of granular material deposited between said structure and the ground, wherein between approximately 45% and approximately 65% by weight of said granular material consists essentially of granules having at least one dimension between approximatley 1.7 millimeters and approximately 2.4 millimeters.

9. A barrier for preventing penetration of termites into a structure from the ground, consisting essentially of:
   a layer of granular material deposited between said structure and the ground, wherein between 60% by weight of said granular material consists essentially of granules having diameters between approximatley 1.7 millimeters and approximately 2.4 millimeters.

10. A barrier for preventing penetration of termites into a structure from the ground, as described in any one of claims 1 to 13, wherein said granular material is selected from the group consisting of crushed rock, gravel, sand and basalt.

11. A barrier for preventing penetration of termites into a structure from the ground, as described in claim 10, wherein said layer for granular material is compacted.

12. A barrier for preventing penetration of termites into a structure from the ground, as described in claim 11, wherein said compacted layer of granular material has a thickness of approximately 4 inches.

13. A barrier for preventing penetration of termites into a structure from the ground, comprising:
   depositing a layer of granular material between said structure and the ground, wherein between approximately 45% and approximately 65% by weight of said granular material consists essentially of granules having at least one dimension between approximatley 1.7 millimeters and approximately 2.4 millimeters.

14. A process for preventing penetration of termites into a structure from the ground, as described in claim 13, wherein between approximatley 50% and approximatley 60% by weight of said granular material consists essentially of granules having at least one dimension between approximately 1.7 millimeters and approximately 2.4 millimeters.

15. A process for preventing penetration of termites into a structure from the ground, as described in claim 13, wherein approximately 60% by weight of said granules having at least one dimension between approximately 1.7 millimeters and approximately 2.4 millimeters.

16. A process for preventing penetration of termites into a structure from the ground, as described in claim 13, wherein approximately 45% by weight of said granules having at least one dimension between approximately 1.7 millimeters and approximately 2.4 millimeters.

17. A process for preventing penetration of termites into a structure from the ground, as described in claim 13, wherein approximately 65% by weight of said granular material consists essentially of granules having at least one dimension between approximately 1.7 millimeters and approximately 2.4 millimeters.

18. A process for preventing penetration of termites into a structure from the ground, as described in claim 13, wherein approximately 50% by weight of said granular material consists essentially of granules having at least one dimension between approximately 1.7 millimeters and approximately 2.4 millimeters.

19. A process for preventing penetration of termites into a structure from the ground, as described in any one of claims 13 to 18, wherein said granular material is selected from the group consisting of crushed rock, gravel, sand and basalt.

20. A process for preventing penetration of termites into a structure from the ground, as described in claim 19, further comprising:
   compacting said layer of granular material.

21. A process for preventing penetration of termites into a structure from the ground, as described in claim 20, wherein said layer of granular material has a thickness of approximately 4 inches after such compacting.

22. A process for preventing penetration of termites from the ground to a concrete slab that is to be poured into an excavation, comprising:
   depositing a layer of granular material in said excavation;
   compacting said layer; and
   pouring said slab over said layer, wherein between approximatley 45% and approximately 65% by weight of said granular material consists essentially of granules having at least one dimension between approximately 1.7 millimeters and approximately 2.4 millimeters.

23. A process for preventing penetration of termites from the ground to a concrete slab that is to be poured into an excavation, as described in claim 22, wherein between approximatley 50% and approximately 60% by weight of said granular material consists essentially of granules having at least one dimension between approximately 1.7 millimeters and approximately 2.4 millimeters.

24. A process for preventing penetration of termites from the ground to a conrete slab that is to be poured into an excavation, as described in claim 22, wherein approximately 60% by weight of said granular material consists essentially of granules having at least one dimension between approximately 1.7 millimeters and approximately 2.4 millimeters.

25. A process for preventing penetration of termites from the ground to a concrete slab that is to be poured into an excavation, as described in claim 22, wherein approximately 45% by weight of said granular material consists essentially of granules having at least one dimension between approximately 1.7 millimeters and approximately 2.4 millimeters.

26. A process for preventing penetration of termites from the ground to a concrete slab that is to be poured into an excavation, as described in claim 22, wherein approximately 50% by weight of said granular material consists essentially of granules having at least oen dimension between approximately 1.7 millimeters and approximately 2.4 millimeters.

27. A process for preventing penetratio of termites from the ground to a concrete slab that is to be poured into an excavation, as described in claim 22, wherein approximately 60% by weight of said granular material consists of granules having diameters between approximately 1.7 millimeters and approximately 2.4 millimeters.

28. A process for preventing penetration of termites from the ground to a concrete slab that is to be poured into an excavation, as described in any one of claims 22 to 27, wherein said granular material is selected from the group consisting of rock, gravel, sand and basalt.

29. A process for preventing penetration of termites to a concrete slab that is to be poured into an excavation, as described in claim 28, wherein said layer has a thickness of approximately 4 inches after such compacting.

30. A process for preventing penetration of termites from the ground to a concrete slab that is to be poured into an excavation, as described in claim 22, wherein approximately 65% by weight of said granular material consists essentially of granules having at least one dimension between approximately 1.7 millimeters and approximately 2.4 millimeters in diameter.

31. A building construction for preventing penetration of termites, comprising:
   a compacted layer of granular material having a thickness of approximately 4 inches, wherein between approximately 45% and approximately 65% by weight of said granular material consists essentially of granules having at least one dimension between approximately 1.7 millimeters and approximately 2.4 millimeters;
   a vapor barrier placed on top of said layer; and
   a concrete slab poured on top of said vapor barrier.

32. A building construction for preventing penetration of termites, comprising:
   a compacted layer of granular material having a thickness of approximately 4 inches, wherein between approximately 50% and approximately 60% by weight of said granular material consists essentially of granules having at least one dimension between approximately 1.7 millimeters and approximately 2.4 millimeters;
   a vapor barrier placed on top of said layer; and
   a concrete slab poured on top of said vapor barrer.

33. A building construction for preventing penetration of termites, comprising:
   a compacted layer of granular material having a thickness of approximately 4 inches, wherein approximately 60% by weight of said granular material consists essentially of granules having diameters between approximately 1.7 millimeters and approximately 2.4 millimeters;
   a vapor barrier placed on top of said layer; and
   a concrete slab poured on top of said vapor barrier.
   a concrete slab poured on top of said vapor barrier.

34. A building construction for preventing penetration of termites, as described in any one of claims 31 to 33, wherein said granules are selected from the group consisting of sand, gravel, basalt and rock.

35. A process for preventing penetration of termites into a structure from the ground, comprising:
   depositing a layer of granular material between said structure and the ground, wherein between approximately 45% and approximately 65% by weight of said granular material consists of granules having at least one dimension between approximately 1.7 millimeters and approximately 2.4 millimeters.

36. A process for preventing penetration of termites into a structure from the ground, as described in claim 35, wherein between approximately 50% and approximately 60% by weight of said granular material consists of granules having at least one dimension between approximatley 1.7 millimeters and approximately 2.4 millimeters.

37. A process for preventing penetration of termites into a structure from the ground, as described in claim 35, wherein approximately 60% by weight of said granular material consists of granules having at least one dimension between approximately 1.7 millimeters and approximately 2.4 millimeters.

38. A process for preventing penetration of termites into a structure from the ground, as described in claim 35, wherein approximately 45% by weight of said granular material consists of granules having at least one dimension between approximately 1.7 millimeters and approximately 2.4 millimeters.

39. A process for preventing penetration of termites into a structure from the ground, as described in claim 35, wherein approximately 65% by weight of said granular material consists of granules having at least one dimension between approximatley 1.7 millimeters and approximately 2.4 millimeters.

40. A process for preventing penetration of termites into a structure from the ground, as described in calim 35, wherein approximately 50% by weight of said granular material consists of granules having at least one dimension between approximatley 1.7 millimeters and approximately 2.4 millimeters.

41. A new use for a granular material that includes between approximately 45% and approximately 65% by weight of granules having at least one dimension between approximatley 1.7 millimeters and approximatley 2.4 millimeters, comprising:
   depositing a layer of said granular material between a structure and the ground to prevent penetration of termites into said structure from the ground.

42. A new use for a granular material that includes between approximately 50% and approximately 60% by weight of granules having at least one dimension between approximatley 1.7 millimeters and approximatley 2.4 millimeters, comprising:
   depositing a layer of said granular material between a structure and the ground to prevent penetration of termites into said structure from the ground.

43. A new use for a granular material that includes approximately 40% by weight of granules having at least one dimension between approximately 1.7 millimeters and approximatley 2.4 millimeters, comprising:
   depositing a layer of said granular material between a structure and the ground to prevent penetration of termites into said structure from the ground.

44. A new use for a granular material that consists essentially of between approximately 45% and approximately 65% by weight of granules having at least one dimension between approximately 1.7 millimeters and approximately 2.4 millimeters, comprising:
   depositing a layer of said granular material between a structure and the ground to prevent penetration of termites into said structure from the ground.

45. A new use for a granular material that consists essentially of between approximately 50% and approximately 60% by weight of granules having at least one dimension between approximately 1.7 millimeters and approximately 2.4 millimeters, comprising:
   depositing a layer of said granular material between a structure and the ground to prevent penetration of termites into said structure from the ground.

46. A new use for a granular material that consists essentially of approximately 60% by weight of granules having at least one dimension between approximately 1.7 millimeters and approximately 2.4 millimeters, comprising:

depositing a layer of said granular material between a structure and the ground to prevent penetration of termites into said structure from the ground.

47. A new use for granular material according to any one of claims 41 to 46, wherein:
    said granules are selected from the group consisting of crushed rock, gravel, sand and basalt.

48. A new use for a granular material according to any one of claims 41 to 46, wherein:
    said granuels comprise crushed basaltic rock.

49. A new use for a granular material according to any one of claims 41 or 46, wherein said granules have a specific gravity of approximately 2.9

50. A new use for a granular material according to any one of claims 41 to 46, wherein:
    said granules are compacted.

51. A new use for a granular material according to claim 50, wherein:
    said granules are compacted to a layer approximately 4 inches thick.

* * * * *

UNITED STATES PATENT AND TRADEMARK OFFICE
CERTIFICATE OF CORRECTION

PATENT NO. : 5,094,045

DATED : March 10, 1992

INVENTOR(S) : Minoru Tamashiro

It is certified that error appears in the above-identified patent and that said Letters Patent is hereby corrected as shown below:

On the title page, item (56): References cited, delete "Abams" and substitute -- Abrams --.

column 1, lines 37-38, delete "stribution" and substitute -- distribution --.

Column 4:
In claim 1, line 8, delete "approximatley" and substitute -- approximately --; in claim 6, line 5, delete "60% and approximately 50%" and substitute -- 50% and approximately 60% --; in claim 6, line 8, delete "approximatley" and substitute -- approximately --.

Column 5:
In claim 8, line 9, delete "approximatley" and substitute -- approximately --; in claim 9, line 5, delete "between" and substitute -- approximately --; in claim 10, line 3, delete "1 to 13" and substitute -- 1 or 6-9 --; in claim 13, line 1, delete "barrier" and substitute -- process --; in claim 13, line 8, delete "approximatley" and substitute -- approximately --; in claim 14, line 3, delete "approximatley" and substitute -- approximately --; in claim 14, line 4, delete "imatley" and substitute -- imately --; in claim 15, line 3, after "said", insert -- granular material consists essentially of --; in claim 16, line 3, after "said", insert -- granular material consists essentially of --.

Column 6:
In claim 22, line 8, delete "approximatley" and substitute -- approximately --; in claim 24, line 2, delete "conrete" and substitute -- concrete --; in claim 26, line 5, delete "oen" and substitute -- one --; in claim 27, line 1, delete "penetratio" and substitute -- penetration --.

In claim 28, line 5, after "of", insert -- crushed --; in claim col. 7, line 48, delete "a concrete slab poured on top of said vapor barrier."; in claim 34, line 4, after "and", insert -- crushed --;

UNITED STATES PATENT AND TRADEMARK OFFICE
CERTIFICATE OF CORRECTION

PATENT NO. : 5,094,045

DATED : March 10, 1992

INVENTOR(S) : Minoru Tamashiro

It is certified that error appears in the above-identified patent and that said Letters Patent is hereby corrected as shown below:

Column 7:

in claim 36, lines 5-6, delete "approximatley" and substitute -- approximately --.

Column 8:

In claim 41, line 4, delete "approximatley" and substitute -- approximately --; in claim 41, lines 4-5, delete "approximatley" and substitute -- approximately --; in claim 42, line 4, delete "approximatley" and substitute -- approximately--; in claim 42, lines 4-5, delete "approximatley" and substitute -- approximately --; in claim 43, line 2, delete "40%" and substitute -- 60% --; in claim 43, line 4, delete "approximatley" and substitute -- approximately --.

Column 9:

In claim 47, line 1, after "for", insert -- a --; in claim 48, line 3, delete "granuels" and substitute -- granules --.

Signed and Sealed this

Twenty-eighth Day of September, 1993

Attest:

BRUCE LEHMAN

*Attesting Officer*     *Commissioner of Patents and Trademarks*